June 27, 1967     H. M. CRAWFORD     3,327,519

PIEZOELECTRIC FLUID ANALYZER

Filed May 14, 1963     3 Sheets-Sheet 1

Harry M. Crawford     INVENTOR

BY David A. Roth

PATENT ATTORNEY

Harry M. Crawford  INVENTOR
BY David A. Roth
PATENT ATTORNEY

June 27, 1967 H. M. CRAWFORD 3,327,519
PIEZOELECTRIC FLUID ANALYZER
Filed May 14, 1963 3 Sheets-Sheet 3
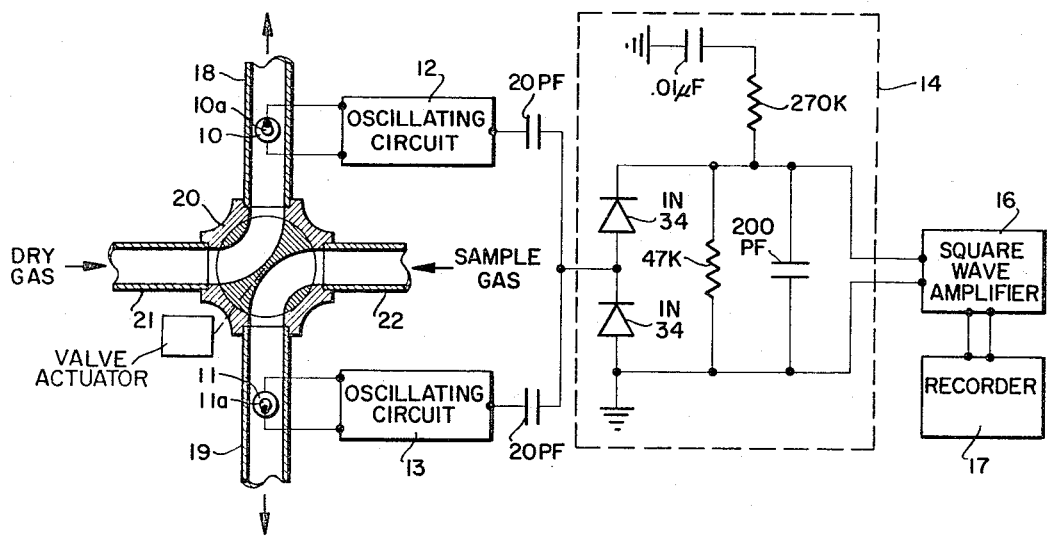
FIG.-3
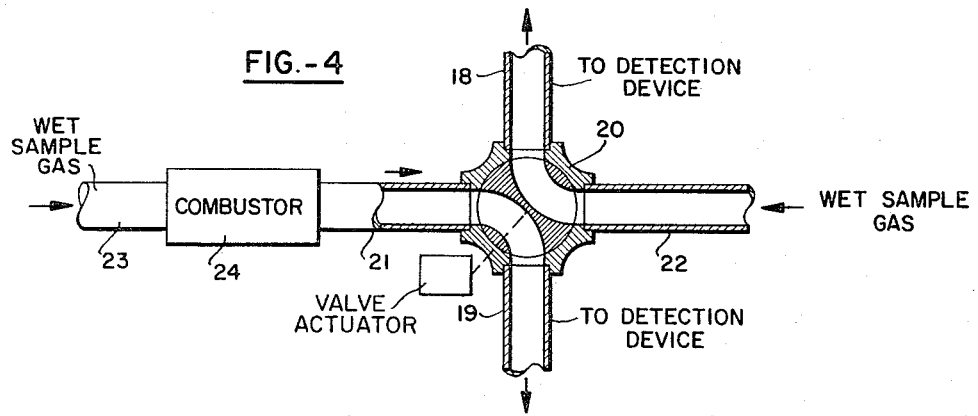
FIG.-4
FIG.-5
Harry M. Crawford INVENTOR
BY David A. Roth
PATENT ATTORNEY

United States Patent Office 3,327,519
Patented June 27, 1967

3,327,519
PIEZOELECTRIC FLUID ANALYZER
Harry M. Crawford, Port Murray, N.J., assignor to Esso Research and Engineering Company, a corporation of Delaware
Filed May 14, 1963, Ser. No. 280,408
6 Claims. (Cl. 73—23)

This invention relates to methods and apparatus for improved analysis. In particular, the invention relates to coated responsive materials; analyzers containing such coated materials; and methods of using the foregoing to analyze certain fluid materials, such as gases. Even more particularly, the invention is adapted to measure water concentrations in a fluid, particularly a gas.

The analysis of fluid, e.g., gas, compositions is of great importance in industry, research institutions, and the like. Examples include gas chromatography where it is necessary to determine the composition of the effluent; determining water in fuel, water and/or $H_2$ in powerformer recycle gas; $CO_2$ in exhaust and flue gas; and $SO_2$ and $SO_3$ in sulfur analysis. There are, of course, many other areas of application.

The instant invention is an improvement of the invention described in copending, commonly assigned application S.N. 232,742, filed by William H. King, Jr. on Oct. 24, 1962 now U.S. Patent No. 3,260,104. The entire disclosure of said copending application is incorporated herein by reference although as much of said application will be repeated here as is necessary to avoid constant reference to said application.

In the copending application it was disclosed that piezoelectric materials when coated with a substrate selectively sensitive to components in their environment can serve as detection devices for use in certain types of analyzers. For example, piezoelectric materials coated with a substrate will exhibit different vibrational frequencies and amplitudes depending on the amount of material which interacts with the substrate. Thus, a detection device in an analyzer can measure composition by sensing its own mass change.

In brief, the invention of Patent No. 3,260,104 particularly relates to analyzers which use two detection devices, at least one of such detection devices contains a substrate selective to a particular material to be detected. The net output of the two detection devices is a measure of the interaction of at least one component to be detected with the substrate.

In the copending application, "detection device" is defined as a responsive material usually having a substrate on it but not necessarily having a substrate. If two detection devices are used in an analyzer then at least one of said detection devices has a substrate, usually both. The substrates are usually different on both detection devices. However, the same substrate can be used by keeping one detection device at a different temperature than the other. If only one detection device is used in an analyzer then it will always have a substrate.

The instant invention relates to an analyzer and a method of operating the analyzer, when the analyzer contains two matched, substantially identical, detection devices which both have about the same quantity of the same substrate on them. In the instant invention, a detection device is described as a responsive material having a substrate coated thereon.

The analyzer of Patent No. 3,260,104 analyzes fluid compositions by determining the change in frequency or amplitude which is proportional to the amount of material that selectively interacts with the substrate on a responsive material. The substrate is preferably coated on the responsive material in very small amounts. When the responsive material is placed in a suitable circuit, for instance, an oscillating circuit, it will vibrate at a particular, natural frequency. The oscillation changes as the mass of material which interacts with the substrate changes. The amount of change is usually determined by using two detection devices of substantially matched frequencies or amplitudes. One is coated with a substrate selective to the component to be analyzed. The other either has no substrate or a substrate that is not selective to any component in the sample stream. This is the reference detection device of Patent No. 3,260,104. It is the change in oscillation that can be measured and serves as the basic analytical tool. The change in oscillation can be either in frequency or amplitude or other measurable change.

The preferred analyzer of the invention in the copending application consists of a detector-oscillating-circuit and a reference-oscillating-circuit. The detector-oscillating-circuit has a detection device with a substrate selective to a component to be detected. The reference-oscillating-circuit has a detection device with either no substrate on the responsive material or a substrate not selective to the material to be detected. A mixing circuit matches off the signals from the detector-oscillating-circuit and the reference-oscillating-circuit and transmits a net difference signal to a display device. Mixing circuits are well known in the art and need not be further described. This difference signal is usually an audio signal but can be a radio signal. The display device can be a visual means of seeing a digital or analog signal such as a recorder. Preferably the signal received from the mixing circuit is a frequency in the audio range. For research work and other high precision type operations digital display is preferred. Analog display can be used such as an indicating meter, a recorder, and the like.

The instant invention uses the same basic theory of construction with respect to the oscillating circuits except that there are two substantially identical, detector-oscillating-circuits. The reference-oscillating-circuit has, in effect, been replaced with another detector-oscillating-circuit.

The preferred detection device for water detection measures $H_2O$ composition by sensing the mass of $H_2O$ vapor that selectively interacts (sorbs) into the substrate. It will be appreciated that a mass change suitable for determining composition can also be obtained because of interaction with the material to be detected by physical and chemical adsorption, absorption (sorption), chemical reactions, and the like. In a typical use such as continuous monitoring of a stream containing a component to be detected, e.g. $H_2O$, when using the adsorption mode of operation, $H_2O$ will be sorbed by the substrate and desorbed from the substrate in proportion to the amount of $H_2O$ in the sample stream. Thus, the partial pressure of the component adsorbed on the substrate will equilibrate with the partial pressure of that component in the sample stream.

For instance, consider the situation where water vapor is to be detected in a gaseous stream, the responsive material is a piezoelectric crystal and the substrate is a sulfonated polystyrene which is described later herein. As the concentration of water vapor increases in the sample stream the amount of water sorbed into the substrate increases. The term sorption is used since the interaction of $H_2O$ and many other unknown materials with the substrate is probably a combination of adsorption and absorption. When the water vapor in the stream decreases, the substrate will lose water vapor to the stream thus decreasing the overall mass of the detection device. Either the increase or decrease in the amount of sorbed water vapor results in a measurable change in oscillation which is proportional to the amount of water vapor present in the stream.

It has been observed that there is a time lag in response in some instances where a detection device has been exposed to a high level of vapor and is subsequently exposed to a low level of water vapor. The desorption of water from the substrate may not be complete for an hour or so. In many instances the response time of an hour or so is undesirable since response times in the order of minutes is often required for commercial uses.

The method and apparatus of the invention overcomes this time lag (which is also referred to as hysteresis) by using two substantially identical substrate-coated crystals which are alternately subjected to a sample stream containing water vapor and a substantially dry stream which contains no water vapor. The cyclic switching of the streams is usually carried out every few seconds. The optimum time period can be easily determined empirically. It will usually be in the order of 25 to 60 seconds. It can be as short as ten seconds and as long as 10 minutes.

By alternately contacting each detection device with a sample stream and a dry stream every few seconds, the hysteresis effect is cancelled out. The substrate never has a chance to build up such a large amount of adsorbed $H_2O$ that desorption of the water takes a long time. Moreover, if the substrate tends to hold a residual amount of water, then both matched detection devices hold the same amount of residual $H_2O$ or other impurity and the effect is cancelled out.

The invention can be fully understood by referring to the description herein and the claims taken in conjunction with the accompanying drawings wherein:

FIGURE 3 is a schematic of one preferred embodiment of the invention, i.e. the water analyzer.

FIGURE 4 is a schematic of another preferred embodiment of the invention, i.e. for trace hydrocarbon or alcohol analysis.

FIGURE 5 is a schematic of an embodiment of the invention showing the use of two three-way valves.

Figure 1:
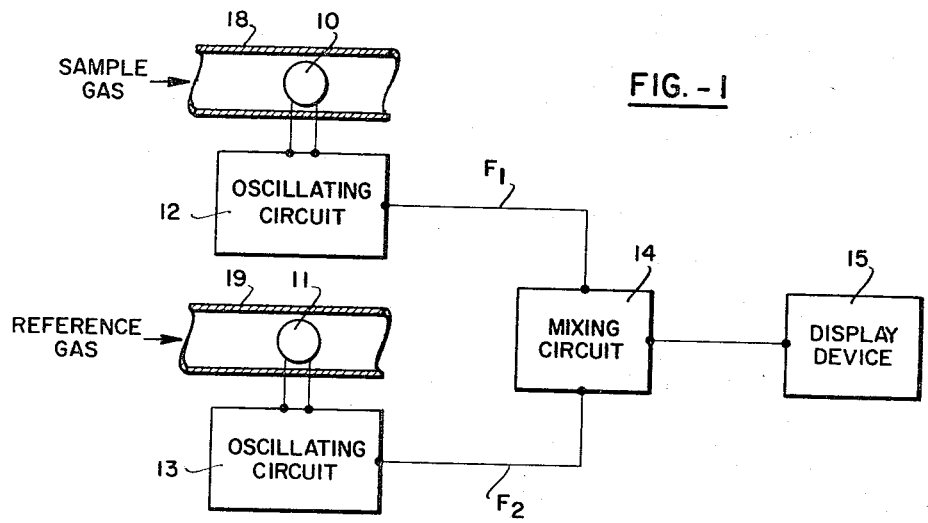
FIGURES 1 and 1A are block schematics of the apparatus and technique of the invention.
Figure 1A:
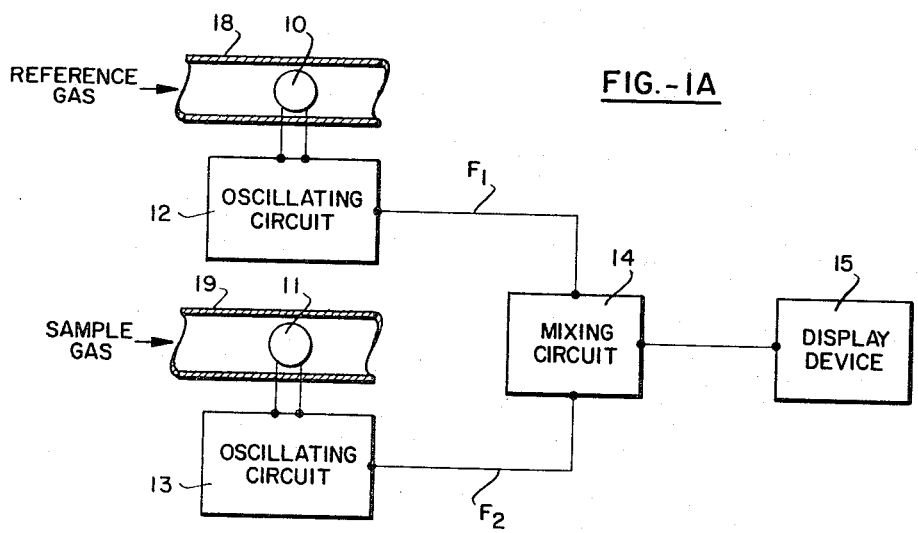

Referring now to FIGURES 1 and 1A, block schematics are presented representing a typical analyzer of the invention. Gas containing a component to be detected is alternately flowed over identical detection devices 10 and 11 which are connected to oscillating circuits 12 and 13 respectively. There it is seen that the frequency F-1 from from oscillating circuit 12 and frequency F-2 from oscillating circuit 13 are conveyed into mixing circuit 14 which is similar to an ordinary radio receiver circuit, where the smaller frequency signal is subtracted from the larger foregoing signal. From the mixing circuit a signal equal to F-1 minus F-2 (or F2—F1) is passed into display device 15. This means of subtracting a smaller frequency from a larger one to result in a single net frequency which is measured is referred to as the beat frequency method or means of measurement. The detection devices are substantially identical and have a substrate coated thereon, preferably a sodium salt of a sulfonated polystyrene for moisture analysis.

The sample gas stream and the reference gas stream are periodically interchanged. For measuring $H_2O$ content of the sample stream, the reference gas is preferably dry air. This dry gas can be supplied in any convenient manner such as by apparatus described in U.S. Patent 2,944,627 issued to C. W. Skarstram. Suitable dry air devices can be obtained by Gilbert & Barker Company of Springfield, Mass. and other manufacturers.

Figure 2:
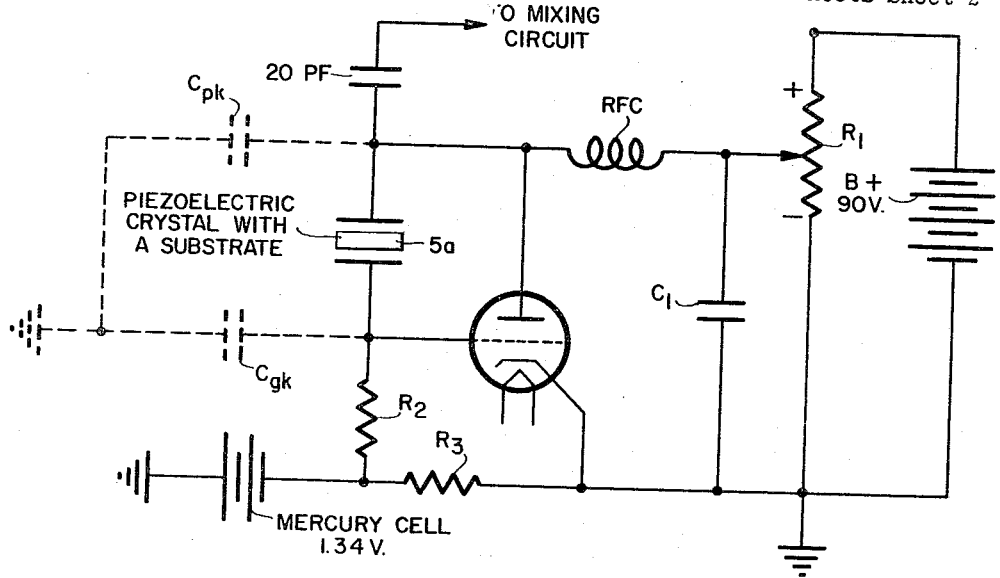
FIGURE 2 is a typical oscillator circuit which can be used for frequency or amplitude measurement, two of which can be used in the analyzers of the invention.

Turning now to FIGURE 2, there is depicted a specific embodiment of a typical oscillator circuit two of which can be used for the two detection-oscillating-circuits needed in the analyzer of the instant invention.

Specifically, this circuit is a Pierce oscillator which is essentially a Colpitts Hartley oscillator having its inductance-capacitance tank circuit replaced by the quartz crystal. B+ voltage is applied across the cathode and the plate of the triode. The value may be adjusted by varying the resistance of potentiometer R–1 so as to obtain approximately 1.34 volts across resistance R–3. This voltage opposes the standard 1.34 volts of the mercury cell resulting in zero potential output. Thus, the output from the grid is a signal proportional to the changes in the grid bias. This grid bias directly reflects changes in amplitude of vibration of piezoelectric crystal, i.e., detection device 5a. The radio frequency choke (RFC) and the capacity C–1 prevent the radio frequency current from entering the direct current power supply. Capacity C–2 keeps the radio frequency signal out of the output. Detection device 5a is connected directly between the grid and the plate, and the amount of feedback is dependent on the interelectrode and other capacitances that may exist from the grid to cathode and the plate to cathode circuits, and the properties of the responsive material of the detection device. A frequency signal can be obtained directly from detection device 5a as shown.

This feedback and the setting of R–1 determine the amplitude of vibration of the piezoelectric crystal used as the responsive material of detection device 5a. The plate-to-cathode and grid-to-cathode capacitances are shown in the circuit by means of dotted lines. Resistors R–2 and R–3 serve as the grid leak bias. Thus the circuit shown can be used for either frequency or amplitude measurement.

Other appropriate circuits well known in the art may also be employed to oscillate the detection device. In addition, it should be emphasized that the particular type of oscillator circuit within which the crystal is placed is not critical. There are many such oscillators which may be used, for example, the Hartley oscillator and its many modifications, the tuned grid-tuned plate oscillator, the Dynatron oscillator, the transitron oscillator, and many forms of other feedback oscillators. If amplitude measurement is desired it can be accomplished conveniently by measuring the rectified grid current in the oscillator circuit. There are many other ways to measure amplitude well known to those skilled in the art. If transistor oscillators are used, the amplitude of vibration is indicated by collector current or base bias voltage. The choice of the oscillator depends on the particular stability requirements and, naturally, affects the sensitivity of the detection apparatus. If frequency measurement is desired, there are likewise many suitable circuits known to the art. The necessary modifications of oscillator circuits required to secure high efficiency and stability are well within the knowledge of those skilled in the art.

A preferred embodiment of the present invention is the water analyzer which uses a piezoelectric crystal as a responsive material for both the oscillator circuits. The detection devices of the oscillating circuits preferably have a sodium salt of a sulfonated polystyrene as the active substrate. Other good substrate materials when water is to be detected include ion exchange resins, molecular sieves, silica gel, alumina, and many other hydrophilic substances. The preferred materials to be used on the responsive material for the detection device of the detector circuit are the salts of sulfonated solid and liquid polymers of vinyl aromatics including vinyl benzenes having 1 to 6 vinyl groups per benzene molecule, preferably divinyl benzenes, and especially preferred, styrene. These salts are preferably metal salts but can also be formed from other cations, for example, amine salts.

The particular "responsive material" which may be employed in accordance with this invention is defined as any material which exhibits piezoelectric properties.

The material exhibits piezoelectric properties if, when subject to mechanical pressure, it develops an electrical potential and vice versa, when subject to an electrical potential, it mechanically deforms. Several such materials are known, for example, crystals such as quartz, tourmaline, and Rochelle salts and other materials such as barium titanate. Quartz is the particular crystal most often employed in electrical applications, but the instant invention is not to be limited thereto.

The particular frequency at which the material oscillates is dependent on several factors, for example, the thickness of the material and, in the case of crystals, the particular axis which it was cut along; the electrode structure; the characteristics of the associated circuit; temperature; etc. If it is desirable to have a circuit of extremely high stability, it is often advantageous to maintain the responsive material and its associate parts in a thermostatically controlled environment such as an oven. In the application of the instant invention, the temperature of the gaseous composition to be analyzed must be considered so as not to adversely affect the temperature of the crystal.

"Substrate" as used in the instant invention shall be taken to mean any thin film or coating deposited in predetermined quantity on the responsive material. The substrate may be either liquid or solid.

Details on the application of substrates to crystals, commercially available crystals, and types of substrates available are disclosed in full in copending application Patent No. 3,260,104. These details are not a part of the instant invention.

In brief, although many substrates can be used the preferred one is the sodium salt of sulfonated, noncrosslinked, high molecular weight, polystyrene polymer prepared by a technique published by Dr. Albon F. Turbak, i.e. vol. 1, p. 275 of the December 1962 Industrial & Engineering Chemical Quarterly (Product Research & Development).

The preferred polymer before sulfonation has a molecular weight of from 5,000 to 10,000,000 preferably 500,000 to 5,000 000 and, even more preferably, 1,000,000 to 2,000,000 (Staudinger). The molecular weight of a monovalent metal salt of the sulfonated polymer is about double that of the polymer itself. A film of substrate, e.g. sulfonated polymer salt, is applied to the center of the responsive material to be used as the detection device. This material is preferably a piezoelectric crystal. The polymer films have a thickness of 0.01 to 5, e.g. 0.1 to 1, microns and an average weight of about 1 to 500 micrograms per square centimeter. The total thickness of the substrate will not exceed the thickness of the responsive material; more preferably, it will not exceed 35% of the thickness of the responsive material.

The invention is further illustrated by reference to one preferred embodiment in FIGURE 3. In this preferred embodiment two substantially identical detection devices 10 and 11, which are sulfonated polystyrene substrates 10A and 11A with piezoelectric crystals, are connected to oscillating circuits 12 and 13, respectively. The output from oscillating circuit 12 and oscillating circuit 13 flows through two 20 picofarad condensers to mixing circuit 14 which is shown in detail with various circuit elements within the portion outlined by dotted lines. The output from mixing circuit 14 goes into square amplifier 16 and from there into recorder 17. In this particular embodiment the readings are obtained directly on a recorder. They can also be obtained on a meter having a dial face and pointer or other indicating means. The circuit elements can either be conventional electronic tubes or, if very small, hand-carried equipment is desired, tubes can be replaced by transistors.

Detection devices 10 and 11 are enclosed within conduit means 18 and 19, respectively. Conduit means 18 and 19 are connected to two-way valve 20. Also connected to two-way valve 20 are conduits 21 and 22. For water analysis dry gas is introduced into conduit 21 and sample gas is introduced into conduit 22. The gases flow into two-way valve 20 which is actuated so that for one-half a cycle dry gas is flowing through conduit 18 and sample gas through conduit 19; and for the other half cycle, sample gas flows through conduit 18 and dry gas flows through conduit 19. The length of the cycle is empirically determined depending on the unknown to be determined, the quantity present, the size of the substrate, the frequency of the crystal. For the purposes of this embodiment, water is the unknown and the crystals are piezoelectric crystals which are commercially obtained from Reeves-Hoffman, Carlisle, Pa., and have a natural resonant frequency of approximately 9.02 megacycles. For this system it has been found that flow switching cycles of from 0.1 to 120, e.g. 5 to 80, preferably 20 to 70, and most preferably, 25 to 60, seconds give the most satisfactory results.

It will further be understood that the apparatus and technique of the invention can be used to determine net differences in the quantity of an unknown material where both streams contain the unknown material.

FIGURE 4 shows a modification of the device of FIGURE 3 where additional conduit 23 and combustor 24 are provided. The modification of FIGURE 4 permits the determination of trace hydrocarbons, alcohols and other substances that can be converted to water or other substances for which selective substrates are known. For water selective substrates these substances are burned to $H_2O$ in combustor 24 and the difference between the two streams is a measure of the amount of substance in the stream. In such analysis the streams entering conduits 22 and 23 are identical. Th excess $H_2O$ goes into the stream of conduit 23 by means of the combustor 24. Any conventional combustor can be used, e.g. a heated platinum filament.

FIGURE 5 shows an alternative flow switching arrangement in lieu of the two-way valve embodiments previously shown. In FIGURE 5 flow is shown through conduit 21, three-way valve 25, conduit 27, and into conduit 19. At the same time flow is through conduit 22, three-way valve 26, conduit 28, and into conduit 18. It is apparent that when the flows are switched, there will be a flow through conduit 21, three-way valve 25 and into conduit 18. At the same time there will be a flow of the other stream through conduit 22, into three-way valve 26, and into conduit 19.

The invention is further illustrated by the following example.

*Example*

A series of runs was carried out which consisted of passing a stream of gas with a known water vapor concentration over a single detection device in an oscillating circuit. These water vapor concentrations varied from 18 parts per million (p.p.m.) to 100 p.p.m. A recorder trace was produced from these experiments and is illustrated by FIGURE 6.

Figure 6:
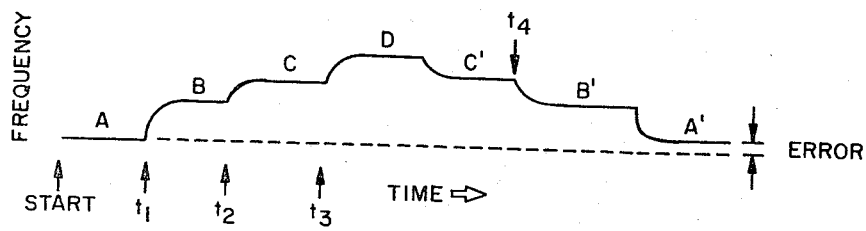
FIGURE 6 shows a representation of a typical recorder trace from an experiment illustrating long response times at decreasing $H_2O$ concentrations.

FIGURE 6 represents the introduction of a gas having a concentration A which was passed over a detection device used in this example. The flow was maintained until time $t_1$, at which time the $H_2O$ content of the gas was increased to concentration B. The concentration of $H_2O$ was increased at different times, i.e. $t_2$, $t_3$, etc. until concentration D was reached. The water level in the gas was then decreased stepwise as it was initially increased. Thus, concentrations $A=A'$, $B=B'$, and $C=C'$. However, for an identical time of exposure to the detection device, the frequencies obtained for A and A', B and B', and C and C' were not the same. If the gas having a concentration C were allowed to flow for a longer time then $t_3-t_2$, then ultimately a point would be reached where the frequency for C would equal the frequency of C'. However, for a continuous flow process this time lag could be quite serious.

Figure 7:
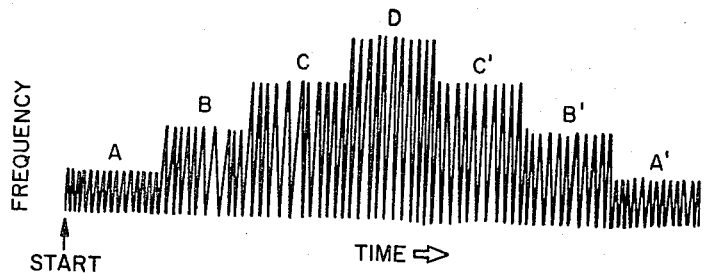
FIGURE 7 shows a representation of a typical recorder trace using the apparatus and technique of the invention.

That the apparatus and process of the invention overcomes the time lag (hysteresis) problem was demonstrated as follows:

The apparatus and process shown in FIGURE 3 was used in the following manner. A sample gas, which consisted of air and various known concentrations of water vapor, was introduced into conduit 22. A reference gas consisting of dry air was introduced into conduit 21. The apparatus was operated so that each detection device was exposed to a flow of sample gas and dry gas alternatively every 30 seconds. The two-way valve 20 is adjusted so as to provide the desired alternate flow. Thus, while one detection device was subjected to a flow of dry gas, the other detection device was exposed to a flow of sample gas. The recorder output is illustrated graphically in FIGURE 7 where beat frequency is plotted as a function of time.

As was described above, $A=A'$, $B=B'$, and $C=C'$. As can be observed, by utilizing the apparatus and process of the invention, the frequencies for decreasing water vapor concentrations, i.e., as $C' \rightarrow B' \rightarrow A'$, are identical to the frequencies for the corresponding increasing water concentrations, i.e. $A \rightarrow B \rightarrow C$.

Although the invention has been described with a certain degree of particularity, it will be understood that minor modifications and changes can be made without departing from the spirit of the invention as hereinafter claimed.

What is claimed is:

1. An analyzer which comprises in combination a first piezoelectric material, a first substrate coated on said first piezoelectric material, a second piezoelectric material, a second substrate coated on said second piezoelectric material, said first and second substrate coated piezoelectric materials being substantially identical; a first electronic oscillator circuit means which is controlled by said first piezoelectric material, a second electronic oscillator circuit means which is controlled by said second piezoelectric material; first fluid stream passage means to said first piezoelectric material, second fluid stream passage means to said second piezoelectric material; means to compare the oscillations of said first and second electronic oscillator circuit means whereby the net oscillations due to the presence of a component of the fluid stream being analyzed can be determined; and means for cyclically alternating said fluid stream being analyzed from said first piezoelectric material to said second piezoelectric material at a rate sufficient to substantially eliminate time lag.

2. An analyzer as defined by claim 1 wherein said first and second substrates comprise sulfonated polystyrene.

3. An analyzer as defined by claim 1 wherein said cyclic alternating means are so adapted as to provide said first and second piezoelectric materials with substantially the same history of exposure.

4. In an analyzer as defined by claim 1, a combustor operatively connected in one of said fluid stream passages.

5. An analyzer as defined by claim 1 wherein said cyclic alternating means comprise an electrically operated two-way valve.

6. An analyzer as defined by claim 1 wherein said cyclic alternating means comprises a neumatically operated three-way valve.

References Cited

UNITED STATES PATENTS

| 2,826,908 | 3/1958 | Skarstram | 73—23.1 |
| 3,194,053 | 7/1965 | Shang | 73—23 |

RICHARD C. QUEISSER, *Primary Examiner.*